United States Patent [19]

Hesline

[11] Patent Number: 5,724,184
[45] Date of Patent: Mar. 3, 1998

[54] POLARIZER WITH BIREFRINGENT PLATE

[76] Inventor: Raymond Hesline, 31 Lilac St., East Bentleigh, Victoria, Australia

[21] Appl. No.: 220,716

[22] Filed: Mar. 14, 1994

Related U.S. Application Data

[62] Division of Ser. No. 807,864, filed as PCT/AU90/00223, May 29, 1990, abandoned.

[51] Int. Cl.[6] .................................................. G02B 5/30
[52] U.S. Cl. ..................... 359/494; 359/495; 359/500
[58] Field of Search ................................. 359/487, 490, 359/494, 495, 496, 498, 499, 500

[56] References Cited

U.S. PATENT DOCUMENTS

| | | | |
|---|---|---|---|
| 1,358,413 | 11/1920 | Brodsky | 359/487 |
| 1,936,953 | 11/1933 | Richter | 359/496 |
| 3,075,869 | 1/1963 | Yamaguti | 359/496 |
| 3,274,881 | 9/1966 | Sauer | 359/495 |
| 3,565,508 | 2/1971 | Dumont | 359/496 |
| 3,868,168 | 2/1975 | DeVeer | 359/495 |

FOREIGN PATENT DOCUMENTS

| | | | |
|---|---|---|---|
| 0054906 | 4/1982 | Japan | 359/496 |
| 0156314 | 1/1963 | U.S.S.R. | 359/496 |
| 0022751 | 8/1893 | United Kingdom | 359/832 |
| 0459171 | 1/1937 | United Kingdom | 359/496 |

*Primary Examiner*—Ricky D. Shafer

[57] ABSTRACT

A polarizing device which separates a beam (1) into polarized component beams (9) and (10) by transmitting beams through isotropic elements (2) and (4) and birefringent plate (3).

1 Claim, 1 Drawing Sheet

POLARIZER WITH BIREFRINGENT PLATE

TECHNICAL FIELD

This invention is a division of U.S. patent application Ser. No. 07/807,864, filed as PCT/AU90/00223, May 29, 1990, now abandoned, and relates to birefringent polarizers and polarizing beam-splitters which separate polarization components by transmitting the components through an interface.

BACKGROUND ART

Many polarizers and polarizing beam-splitters are known to the art, each having disadvantages.

The Glan-Thompson polarizer, which is a block of birefringent material cut into prisms and then cemented together acts by reflecting one polarization component at the cement interface and by transmitting the other. The device requires a considerable amount of birefringent material, generally calcite, which is scarce and expensive, and is unable to work with high powered lasers and ultraviolet light, since the light destroys or clouds cement.

The Glan-Thompson polarizing beam-splitter, which makes use of the reflected polarization component, suffers from the added disadvantage that polarized beams exit the device at inconvenient angles, for example 45 degrees, when it is often useful that beams are parallel, orthogonal or otherwise oriented.

The Glan-Taylor polarizer which is similar to the Glan-Thompson polarizer but uses an air space instead of cement to separate polarization components can work with many light sources but suffers from reflection loss and ghosting caused by the air gap.

The Wollaston, Rochon and Senarmont beam-splitters, which separate polarization components by transmitting the components through an interface, permit optical contacting for use with most light sources, but produce beams which also exit at inconvenient angles, with one or both polarization components suffering from chromatism and distortion.

The double refracting element (beam displacer), which produces parallel polarized beams of light, achieves small beam separation and limited field. Also, since the beams may pass through a considerable amount of material before achieving useful separation, wavefront distortion can occur in the extraordinary beam due to imperfections in the crystal's structure. (See for example, "Birefringence of Quartz and Calcite," Journal of the Optical Society of America, volume 49, No. 7, Jul. 1959, pages 710–712. Beam separation can be further limited by the small size and high cost of suitable crystals.

Polarizing prisms and their various defects are described in detail by Bennett and Bennett, "Polarization," Handbook of Optics, Driscoll and Vaughan, eds., McGraw-Hill, 1978.

DISCLOSURE OF THE INVENTION

It is an object of this invention to provide a birefringent polarizing beam-splitter in which polarized beams of electromagnetic radiation emerge from the device being free from chromatism and distortion and such that angular separation may be greater than for a double refracting element.

It is also an object of the invention to provide a polarizing beam-splitter in which polarized beams of light emerge from said device being oriented at convenient angles.

It is another object of the invention to provide a polarizing beam-splitter which is conservative in the use of birefringent material.

It is a further object of the invention to provide a beam displacer which causes less wavefront distortion in the extraordinary beam than a known birefringent beam displacer.

It is a still further object of the invention to provide an improved polarizer.

To this end, in accordance with the invention, the polarizing device may be comprising first and second isotropic elements of the same refractive index symmetrically arranged about a central birefringent plate, the optic axis of said plate being so arranged that the ordinary and extraordinary component rays of an input ray diverge as said input ray passes from said first isotropic element to said plate whilst said ordinary and extraordinary component rays pass as parallel rays through said second isotropic element.

DESCRIPTION OF PREFERRED EMBODIMENTS

Figure 1:
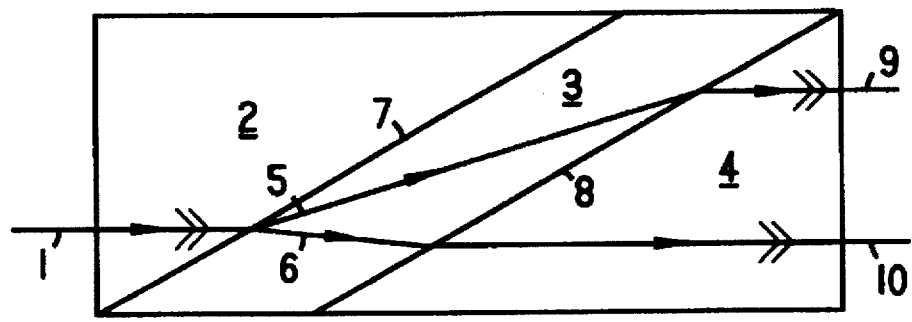
FIG. 1 represents an embodiment in accordance with the invention describing how the beam-splitter operates.

FIG. 1 represents an embodiment in accordance with the invention describing how the beam-splitter operates, in which a beam of electromagnetic radiation 1 enters isotropic element 2 and passes into birefringent plate 3, so that beam 1 separates into orthogonally polarized beams 5 and 6. Since element 3 is double refracting, the beams separate by encountering different refractive indices, as known.

Elements on either side of element 3 have the same refractive index, and so once beams 5 and 6 have passed through element 3, with faces 7 and 8 parallel, the beams will pass into element 4 parallel to related components in 2.

After leaving element 4 component beams become beams 9 and 10 which are parallel to each other and parallel to input beam 1, being free from chromatism and distortion.

Figure 2:
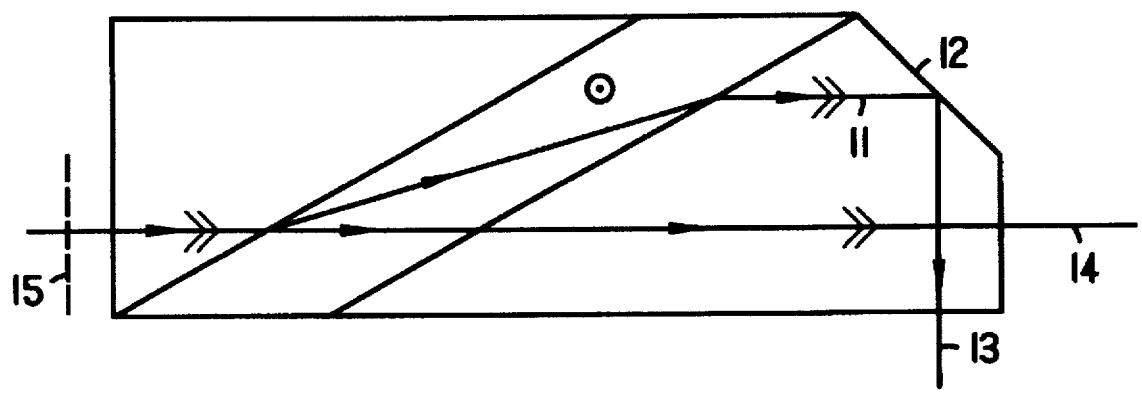
FIG. 2 represents an embodiment in accordance with the invention being a beam-splitter with polarization components exiting at orthogonal angles.

FIG. 2 represents an embodiment in accordance with the invention in which polarization components exit the embodiment at orthogonal angles. In this embodiment the Rochon beam splitting method is employed, shown by the plate having an optic axis perpendicular to the plane of the paper. Beam 11 is reflected from face 12 so as to exit the device as beam 13 being orthogonal to beam 14.

If a quarter waveplate is placed at position 15 then beam 13, when passed through the device in the reverse direction, will pass through the waveplate. On being reflected back through the waveplate the beam will have been rotated by 90 degrees and so will return through the embodiment as beam 14.

In these embodiments, little restriction is placed upon cements which my be used and optical contacting may be employed. Steel, Smartt and Giovanelli have successfully contacted glass and calcite (Australian Journal of Physics, vol. 14, 1961, page 209), and since it is difficult to produce surfaces of the required flatness in prisms (F. Twyman, "Prism and Lens Making," 2nd edition, Hilger & Watts, London, 1952) then in these embodiments the first and third elements could be polished to required flatness as plane parallel sections, later being divided to provide separate elements.

Modifications and variations to the described embodiments will be apparent to those skilled in the art and such modifications and variations should be considered as within the scope of the present invention.

I claim:

1. A polarizing device comprising first and second isotropic elements of the same refractive index symmetrically arranged about a central birefringent plate, the optic axis of said plate being so arranged that ordinary and extraordinary component rays of an input ray diverge as said input ray passes from said first isotropic element into said birefringent plate whilst said ordinary and extraordinary component rays pass as parallel rays through said second isotropic element.

* * * * *